United States Patent
Harris (10) Patent No.: US 8,929,719 B2
(45) Date of Patent: Jan. 6, 2015

(54) FRAME CORRELATING CONTENT DETERMINATION

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 1459 days.

(21) Appl. No.: 12/348,076

(22) Filed: Jan. 2, 2009

(65) Prior Publication Data
US 2010/0172635 A1 Jul. 8, 2010

(51) Int. Cl.
| | | |
|---|---|---|
| G11B 27/00 | (2006.01) |
| H04N 5/93 | (2006.01) |
| H04N 9/80 | (2006.01) |
| G11B 27/034 | (2006.01) |
| G11B 27/28 | (2006.01) |
| G11B 27/10 | (2006.01) |
| G06Q 30/02 | (2012.01) |

(52) U.S. Cl.
CPC .............. *G11B 27/28* (2013.01); *G11B 27/034* (2013.01); *G11B 27/105* (2013.01); *G06Q 30/02* (2013.01)
USPC .......................................... 386/278; 386/239

(58) Field of Classification Search
CPC ............ H04N 21/235; H04N 21/2351; H04N 21/812; H04N 21/2668
USPC .................. 386/239, 240, 248–251, 278–290
See application file for complete search history.

(56) References Cited

U.S. PATENT DOCUMENTS

| | | | |
|---|---|---|---|
| 7,062,510 B1 | 6/2006 | Eldering | |
| 7,181,415 B2 | 2/2007 | Blaser et al. | |
| 7,334,251 B2 | 2/2008 | Rodriguez et al. | |
| 7,428,327 B2 | 9/2008 | Erickson et al. | |
| 7,461,338 B2 | 12/2008 | Landau et al. | |
| 2003/0146915 A1* | 8/2003 | Brook et al. | 345/473 |
| 2004/0162759 A1* | 8/2004 | Willis | 705/14 |
| 2004/0249759 A1* | 12/2004 | Higashi et al. | 705/59 |
| 2006/0041591 A1* | 2/2006 | Rhoads | 707/104.1 |
| 2006/0173985 A1 | 8/2006 | Moore | |
| 2006/0222321 A1* | 10/2006 | Russ | 386/68 |
| 2006/0222322 A1* | 10/2006 | Levitan | 386/68 |
| 2007/0124756 A1 | 5/2007 | Covell et al. | |
| 2008/0007567 A1* | 1/2008 | Clatworthy et al. | 345/619 |
| 2008/0046315 A1 | 2/2008 | Axe et al. | |
| 2008/0065990 A1 | 3/2008 | Harrison et al. | |
| 2008/0092182 A1* | 4/2008 | Conant | 725/109 |
| 2008/0162228 A1* | 7/2008 | Mechbach et al. | 705/7 |
| 2008/0195938 A1* | 8/2008 | Tischer et al. | 715/255 |
| 2008/0235092 A1 | 9/2008 | Song et al. | |
| 2008/0271067 A1 | 10/2008 | Li et al. | |

OTHER PUBLICATIONS

MPEG-7: the generic Multimedia Content Description Standard, Jose M. Martinez, Rob Koenen, and Fernando Pereira, Copyright © 2002 IEEE. Reprinted from IEEE Computer Society, Apr.-Jun. 2002. International Organisation for Standardisation Organisation Internationale De Normalisation ISO/IEC JTC1/SC29/WG11 Coding of Moving Pictures and Audio ISO/IEC JTC1/SC29/WG11N6828, Jose M. Martinez, Oct. 2004.

\* cited by examiner

*Primary Examiner* — Hung Dang
(74) *Attorney, Agent, or Firm* — Law Office of Scott C. Harris, Inc.

(57) ABSTRACT

Identifying and determining content in media, correlating among frames to find that content in other frames, and making a list of that content; and also describes a player which can play the media to include or exclude the content.

19 Claims, 6 Drawing Sheets

FRAME CORRELATING CONTENT DETERMINATION

BACKGROUND

The basic goal of an advertisement is to convince the person watching the advertisement something about a subject. For example, an advertisement may tout virtues of a specific product, e.g., our cars are better, our toilet paper is softer, our foods are tastier. The goal of this kind of advertisement is to convince a person to purchase or otherwise use the advertised product. For example, Acme brand of soda may advertise their brand soda; and a basic goal of doing this is to make more sales of Acme brand soda.

Conventional forms of advertising may include commercials played during breaks in television or other media.

People can walk away during commercials, or fast forward over the commercials when the shows are recorded with video recorders.

There are alternative forms of advertising which become part of the show itself. For example, during the show "American Idol:, there were frequently large glasses of Coca Cola™ soda on the desks in a prominent location. These alternative commercials are viewed as part of the show. This convinces by the power of suggestion.

Non-conventional advertising techniques are also used on the Internet.

SUMMARY

The present inventor recognized that unconventional advertisements that are embedded into the show itself may give up on certain opportunities for royalty streams from the show, e.g from reruns of the show.

An embodiment describes frame correlating ads that controls forming and cataloging ads within programs.

Another embodiment defines finding areas in programs where ads can be "embedded".

Another embodiment describes a media "player" that plays programs and determines embedded advertisements to be included within those programs as played.

Another embodiment defines ads within uploaded videos, such as those uploaded to "YouTube".

BRIEF DESCRIPTION OF THE DRAWINGS

These and other aspects will now be described in detail with reference to the accompanying drawings, wherein.

DETAILED DESCRIPTION

An embodiment describes identifying and determining content in digital media, for example, in video, correlating among frames to find that content in other frames, and making a list of that content; and also describes a player which can play the media to include or exclude the content.

In a first embodiment, the content is advertisements that are formed as part of the media itself, where the media can be television shows and movies, for example. The present application refers to these advertisements as "embedded advertisements", since the advertisements actually become part of the media itself. The specification refers to this first embodiment, however, it should be understood that other embodiments may do this for other kinds of content.

Embodiments describe media sequences and processing those sequences to look for ads. The media sequences can be videos, e.g., television and movies and movies on media such as DVD/BluRay; you tube videos, still image ads such as video billboards, ads on the internet which can be images or HTML forms, or any other form of perceivable media.

Advertising dollars can be received by a show and/or a network for embedded advertisements that form part of a show. However, under current techniques, only a single source of revenue is possible from these embedded ads. Reruns, syndication, sales of DVDs etc will still be made, but there is no way to charge the advertisers for these later sales and/or viewings.

For example, one episode of American Idol plays on TV, and advertisers pay for advertising segments between different segments of the show. When the show is rerun or syndicated in some other form, it may be sent again over another media. Different advertisements can be played during breaks in the show during the reruns. One set of advertisers might pay during the initial airing of the show, and a wholly different set of advertisers may pay during the reruns.

However, the inventor recognized that the embedded advertisements are in essence kept in the media for life. If Coca-Cola paid American Idol to have glasses of Coke sitting on the desk during the American Idol first runs, then reruns, and DVDs of American Idol shows that Coca-Cola forever. Coca Cola does not pay for these aftermarket plays.

The present application describes determining and managing embedded advertisements. According to an aspect, different items and media can be modified to remove embedded advertisements. An aspect describes doing this in television, movies, and videos, such as user-uploaded videos uploaded to YouTube. One embodiment specific describes the use of embedded advertisements within You Tube as a new way of obtaining revenue from such a site.

Another embodiment describes an editor which enables editing different media of this content/and or remove these advertisements. Yet another aspect describes a database and/or clearinghouse system that keeps track of the different kinds of embedded advertisements, and their locations within the video, to facilitate determination of various assets to be changed upon subsequent replays of the video.

Another embodiment describes different ways of making income from embedded advertisements.

Figure 1A:
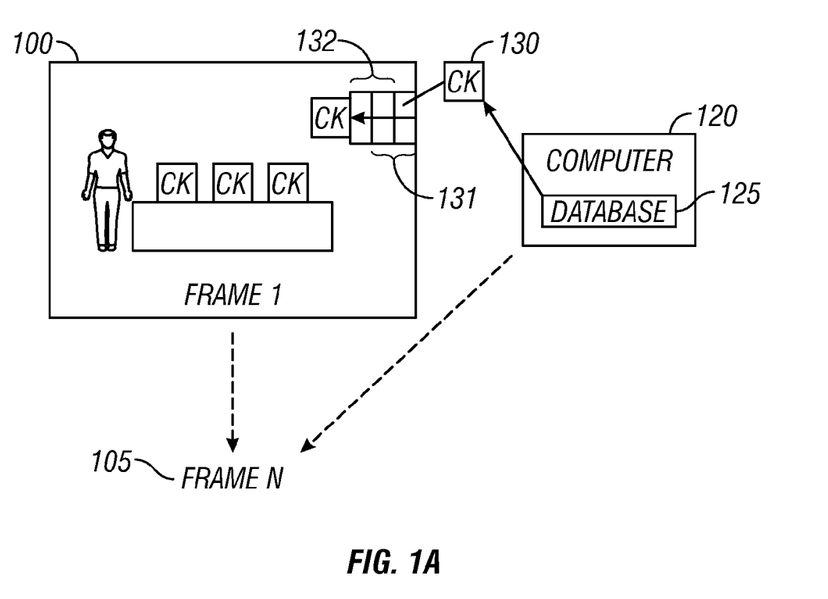
FIGS. 1A and 1B show an embodiment that searches for embedded ad content.
Figure 1B:
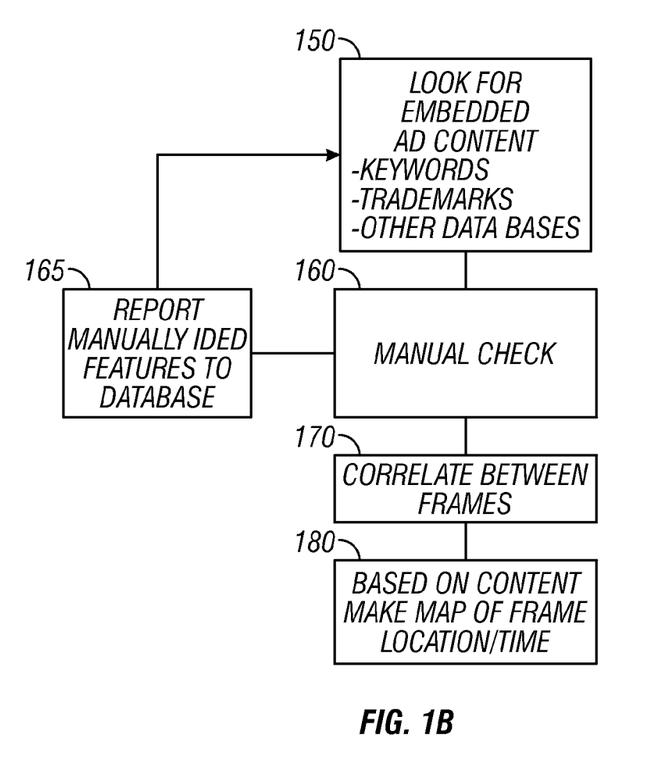

An embodiment is shown in FIGS. 1A and 1B. A frame-based media is shown as 100. This may be a still image, or a single frame of a video that has multiple frames. The video may in general have N multiple frames. where frame N is shown generically as 105. A computer 120 may be a special-purpose video processing computer, or may be a programmed computer is programmed to analyze the content of each frame.

The computer 120 may analyze the content of each frame using correlation kernels such as 130. There may be many correlation kernels, for example, thousands or millions of such kernels. For example, each correlation kernel may represent a specific image of a specific embedded advertisement for which search will be carried out.

The computer 120 may operate according to the flowchart of FIG. 1B.

At 150, the computer uses the correlation kernels (e.g., 130 and others) to analyze the overall content of the scene to find embedded advertisement content within each frame. For example, each frame (or image) may be analyzed to find words that include plaintext indicative of ad items. A list of ad items may be saved for example in database 125. This may include all plaintext words that might be used as ads, as well as all images that might be used as ads. Alternatively, it may include just the ads that actually occur within a certain media sequence.

When looking for Coca-Cola, for example, 150 may look for plaintext words within this scene, and identify any plaintext word that says Coca-Cola.

150 may also look for trademarked images. For example, any image that represents the advertised item, or is recognizable by the viewer as representing that item, may be looked for in this way.

Database 125 may store a dictionary of keywords that represents all of the different kinds of products which might be advertised using embedding in the content. There may also be a database of images or image portions that represents any products. These images or image portions may be from many sources—trademark databases or other images. For example, if an item has a recognizable shape such as the bottle from Coca-Cola, or a specific shade of bluetooth headset that will be placed on a user's ear, the automated system may look for these shapes.

A manual check can be carried out at 160. It should be understood that according to an embodiment, both the main check and a manual check are both carried out. However, even the manual check only be used, or the main check 150 only may alternatively be used.

The manual check at 160 provides a tool that allows a user to select manual areas within each frame that include the embedded ad items therein. This may allow a user to use a digitizer or a mouse for example to draw an area around the embedded ad content.

At 165, the manually identified features are reported back to the database 125. This controls these manually items to be automatically recognized in the future. In one embodiment, the manually recognized items can be manually or automatically processed before adding to the database, to remove background parts and textures that may exist at the edge of the items.

Correlation can be carried out as illustrated in FIG. 1. A number of different correlation kernels are stored in the database 125. One of these correlation kernels may be shown as 130. The correlation kernel 130 is applied to the image 100 (which is typically a single frame of a video). The kernel 130 is "slid" across the entire image. For example, the correlation kernel may first be correlated against the area 131, then moved e.g., one pixel left and correlated against the area 132 that overlaps with the area 131. This correlation may slide across the entire frame.

At each area of correlation, a least mean that squares difference between the may be calculated by the computer 120. This least mean squares difference represents the differences between the values of the image of the correlation kernel 130, and each area such as 131, 132 of the image. A match is established on that value is less than a certain amount.

For example, this may be carried out only on luminance values of the images, or may be carried out in color.

Taking a simple example of correlation over a 3×3 neighborhood, assume that the correlation kernel has the matrix value:
1,6,16
[3,4,12]
2,4,12

This matrix is slid across the whole image and compared against the image at each location. At location 131, the frame may have the value:
3,4,5
[3,5,6]
13,2,1

Each item or pixel of the kernel is compared with an item of the image by squaring the difference between the two. So for location 131, the comparison would yield:

$$LMS=(1-3)^2+(4-6)^2+(5-16)^2+(3-3)^2+\ldots$$

That is, top left minus top left (squared)+top mid-top mid (squared) etc.

Smaller values of LMS indicate better matches between the images.

According to one embodiment, the correlation kernels and the frame images may be luminance only, thereby comparing only the monochrome images. Another embodiment may compare both luminance and color, to obtain more information at the cost of increased processing requirements.

Another embodiment may use fast image correlating techniques to allow the operation to be carried out at a faster speed.

Another embodiment may compare using feature vectors instead of matrices.

Yet another embodiment may obtain a hash value indicative of the kernel and compare that hash value across the frame image to find matches, where the matches can be more carefully examined.

Another embodiment may compare the kernel to the image using fuzzy image comparison techniques.

Another embodiment may use nearest neighbor matching.

After items are found at either 150 or 160 or both, those items are can be automatically found at 170 in other frames using any of the techniques described above. The correlation is carried out between frames. For example, if the item in correlation frame 130 is found or identified either 150 or manually identified 160, the system looks for that either within every other frame of the video.

In another embodiment, the finding of embedded ad items at 170 may be carried out manually.

At 180, based on the content that was found, the system forms a map of frame designations, e.g., frame numbers or time within the video, locations within those frames, and the number of contiguous frames (or total time) over which the information was found.

Figure 2:
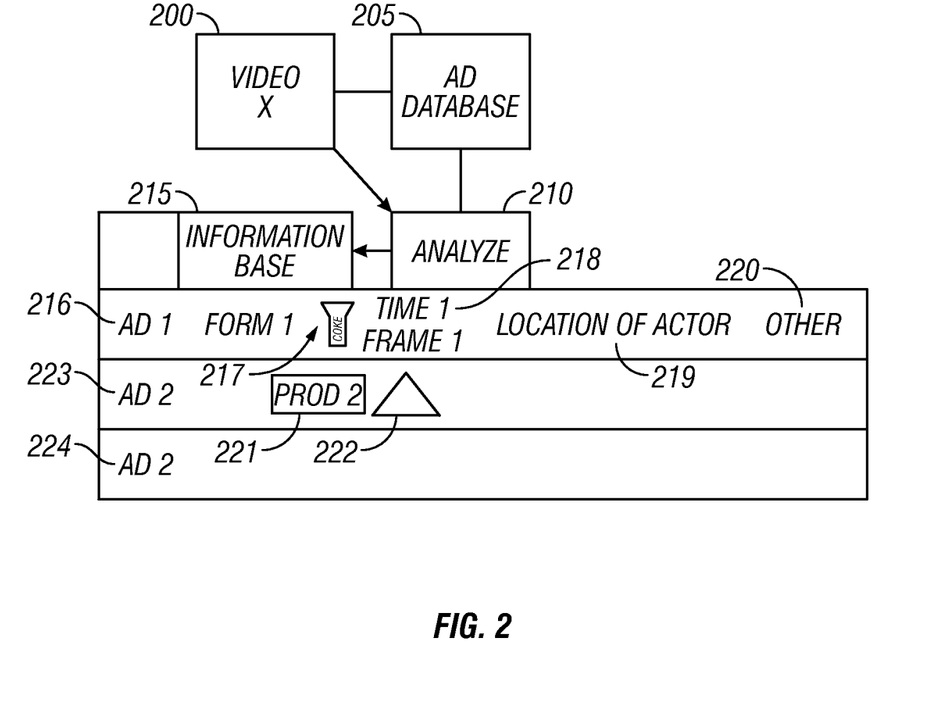
FIG. 2 shows an information base that can be formed and an annotated video that can be formed.

This forms a map or database of information at 180 that indicates presence, location and information about embedded ads. The database of embedded ads may be stored along with the video itself. FIG. 2 illustrates information about how the ads can be stored.

FIG. 2 shows a video file 200 representing the video, here video x, and the associated ad database 205. Both the file and the database can be links to external sources of information. For example, these can be Internet links, or addresses within a memory, either a local memory such a hard drive or a shared memory or, for example, an Internet link. The video 200 may also be the file itself.

The video and advertisement database are analyzed at 210, using automatic and/or manual techniques. According to an embodiment, the automatic technique is used first, and backed up by a manual technique.

The analysis creates an information base for video x 200 that has information about video x. One exemplary information base is a table that is generically shown in 215. The information base may alternatively be a feature vector that includes analogous information or any other form that includes the information that indicates the embedded information.

The table 215 includes a number of different items of information. Each time an embedded ad appears in the video x, that ad receives an entry in the table.

For example, ad one 216 may be an embedded ad for a first product. The ad for the first product may include a number of different forms. For example, where the first product is Coca-Cola, form 1 shown as 217 may be the image of the Coca-Cola cup or a hash of that image. 218 records the times within the video x where that form is found. For example, the information indicative of times may be frame numbers, or any other way of indicating where in the video that form was found.

The specific automobiles may also be cataloged in the same way.

219 represents the location of the ad within the frame itself, e.g., x, y coordinates of the ad.

220 may represent other parameters. As described herein, those parameters may relate to the amount of movement of the part, its brightness, color change from background, and amount of area taken up by the embedded ad portion. The section 220 may generically represent any information that an advertiser or program owner might want to know about the embedded ads.

Some products may also be represented in multiple views and/or multiple ways within video x. Ad2 represents product 2, shown by 221 and 222. Note that there are two different forms for ad2, shown generically as 223 and 224. Each of these forms may have different areas and other characteristics, but can collectively represent the same information.

Other entries can also be provided in the information base. As explained herein, entries can also be provided for areas where new ads could be located.

Outline information can also be included in the information base, that allows removing one existing ad for one product, and replacing these ads with others.

Figure 3:
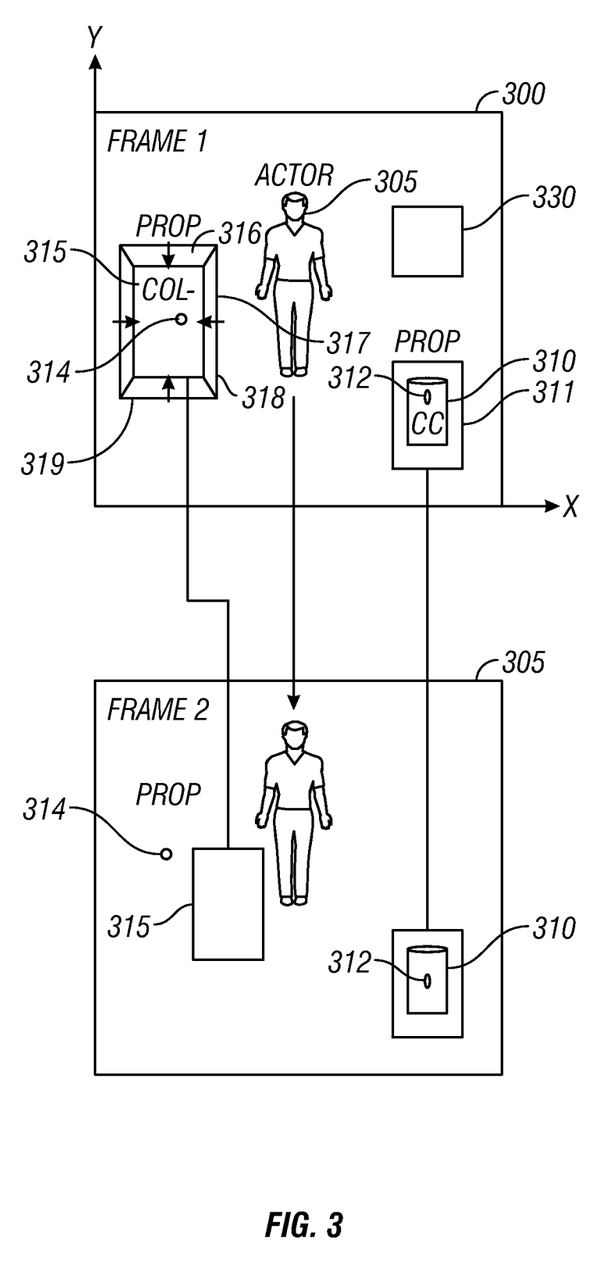
FIG. 3 shows movement within a frame.

FIG. 3 generically represents a frame showing the parts in the frame and the different parameters that might be interested to an immersive advertising contributor. FIG. 3 shows two frames: frame 1 shown as 300, and frame 2 shown as 305. Frames 1 and 2 may be adjacent frames, or may be frames separated by some specified amount of time, for example one frame per second.

In general, the processing of information according to the present system may process only some small subset of frames, for example it may process only one frame per second, one frame every half second, or one frame every 3 seconds. According to another embodiment, the system used herein processes compressed video, and may process only key frames of the compressed video. In addition, this may process only some of the key frames or all of the keyframes. The frames may be keyframes within a compressed video storage system such as MPEG4. It may be reconstructed frames within such a compressed video storage system.

Frame 300 includes a number of items therein, including the actor 305, as well as a number of props 310, 315. Each prop may be defined according to its perimeter. For example, prop 310 may have perimeter 311 that surrounds the prop 310.

The props 310 can be parts with embedded ads therein, or can be any other item in the frame, e.g., lamps, desks, cars, or any other part whatsoever.

The prop also has an area which may be defined according to a coordinate system, for example, shown in FIG. 3 in an x,y coordinate system.

As an alternative embodiment, this may be defined according to area numbers within the frame. The prop 310 can be defined according to its outline 311 or sample size, as well as its center point 312. The content of the prop is also described as above. The prop 312 may be for example a Coca-Cola can as shown.

A second (and subsequent) prop 315 may also be defined.

Areas around the prop are carefully processed according to the present system. For example, the prop 315 may also be defined according to the texture or or other parameters around the area 315. There may be a first texture 316, and second texture 317. Other textures including 318, 319 may also be defined. The textures may be defined as image information about the textures is also stored. In addition, the prop may move to different locations in the frames. For example, prop 315 may have its centerpoint at 314. However, that centerpoint 314 is shown in FIG. 2, but the prop has moved from that centerpoint 314 so that the centerpoint is no longer the centerpoint of the prop 315, in its new location in frame 2.

In addition, there may be areas within the frame that are wholly blank. For example, an area shown as 330 within the frame 380 is wholly blank. Information about blank areas in the frame may be maintained, and may be later used to hold other props, e.g., props for embedded ads. In this embodiment, the frames are analyzed to determine available area, time, movement, brightness and color change from background. Any of these areas can be sold for advertising and the price may depend on any of available area, time, movement, brightness and color change from background.

The information base, e.g., table 215 may also store information about open parts 230. The open parts 230 are where there are no current advertisements, but areas where it is possible to include an embedded advertisement. For example, open area 230 can be defined according to its time, location, and other parameters discussed above.

Figure 4:
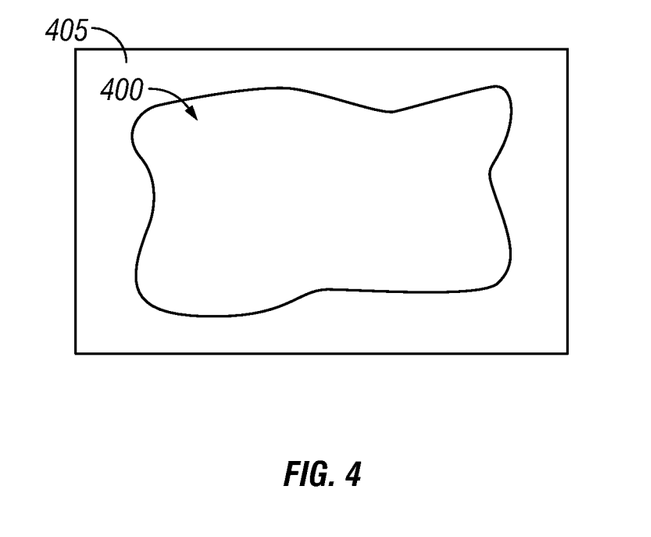
FIG. 4 shows defining an area of movement within the frame.

In another embodiment, part of the open areas includes checking for future movement in other frames. For example, the system may look for actor movement over multiple frames. FIG. 4 illustrates that over 5 or 10 seconds of frames, the actor has only moved within the area shown at 400. This means that area 405 never has actor movement within that time, and hence is wholly open for embedded advertisements. Any area in this part can be sold for use of embedded ads.

The open areas can be inanimate areas, for example, a table that does not move. This table can be annotated, for example, to add a coke glass thereon.

Other inanimate objects can be completely replaced. For example, a lamp can be replaced by some other furniture. One parked car could be replaced by another parked car.

The analysis tool analyzes the entire television or video looking for movements, open areas, inanimate areas, and the like.

Another embodiment may form the video with this information, to make the information base 215 at the time of video creation rather than a later analysis.

The above has described an embodiment where the parts that form the embedded ads can be totally separate from an actor.

In another embodiment, the parts may be worn on an actor. For example, consider FIG. 5 where an actor 500 is wearing a Bluetooth device 505 on their ear. This Bluetooth device 506 may be a recognizable Bluetooth device with a specified design feature, such as the Jawbone™ Bluetooth device or the Plantronics devices that can be easily recognized. Alternative devices, however, may also be processed in an analogous way. For example, the actor 500 may be wearing a specified shirt 510 and specified pants 515 and shoes 520. Any of these items can be processed according to the present system. According to the present system, for example, the Bluetooth device 505 is identified, and a tool, for example a digitizer, is used to draw around the Bluetooth device. This produces an outline 506 around the Bluetooth device.

Figure 5:
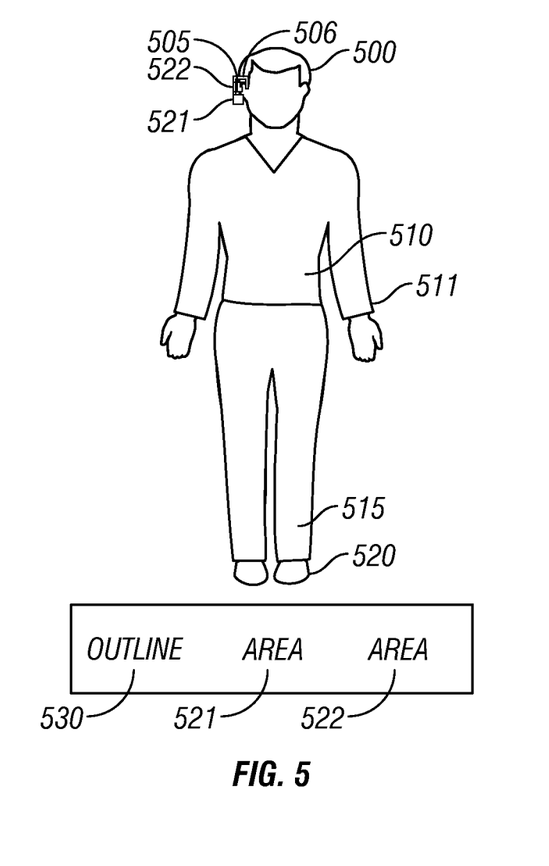
FIG. 5 shows the item being attached to a person within the frame.

The same kind of outline formation may be made around the clothes. An outline of the shirt 511 may be drawn. Information indicative of that outline is store in a file as outline information 530.

For each of a plurality of frames, the area around the outline is also characterized. For example, neighboring areas around the outline may also be characterized. A first area 521 may be characterized, second area 522 may be characterized, etc.

A new embedded advertiser can be added into the frames by removing one device and replacing it with another device. For example, the Bluetooth device 505 can be removed within different frames, and replaced by new information indicative of the areas which have been determined this way.

This information is also stored in the information base—for example, personal part 240 is stored.

According to an embodiment as described above, the system can characterize the different ads which have been embedded within the video, and this information can be stored in the information base.

The information base, or another file associated with the information base, can also store fee paid information for the ads such as 216 etc in the video. Different fees can be paid to allow different access to the ads.

A company may pay a fee that allows the embedded adds to be used indefinitely. This may be recognized by an indication I 264 that a fee has been paid for an indefinite period.

Another fee may extend the embedded ads up until a definite date. In this environment, entry 262 indicates that the embedded ads have been paid up until Sep. 14, 2012.

Other ads may have only such as 263 may only be paid only for a single playing. After the initial showing, the embedded ads have no longer been paid.

At 270, the system forms a new file, called herein annotated video X. The annotated video X is annotated with extra information, here embedded advertisement information that becomes annotation instructions. For example, the annotation instructions may include information from information base: whether ads have been paid for. The annotated video may also include the alternative embedded information, or a link to the information, that allows a developer or a player to change the actual advertising content.

In an embodiment, the media is formed to have a video part 271, and annotation parts (or simply "annotations") 272, 273 that indicate the information about the embedded advertisements. The video part has information parts that can be read by the player, e.g., in MPEG4 or in some other compressed format. The info part has locations/times/etc of embedded ads, e.g., as in information base 215. The info part may also include information about payment status (e.g., 262, 263, 264). The video can be played using the player of FIG. 8, according to the flowchart of FIG. 7, as described herein. The player uses the annotation parts to determine how to play the video.

The media file may also include developer information 273. The developer information can include alternative items, e.g., generic items, that can be put in place of the embedded ads.

In one embodiment, the info part 272 and/or developer part 273 may be cryptographically protected so that only authorized developers can change the advertising content. This may use the content scrambling system "CSS" as used on DVDs, although this can be very weak encryption. It can use the advanced access content system ("AACS") used in blu-ray. It can alternatively use any other form of encryption.

Figure 6:
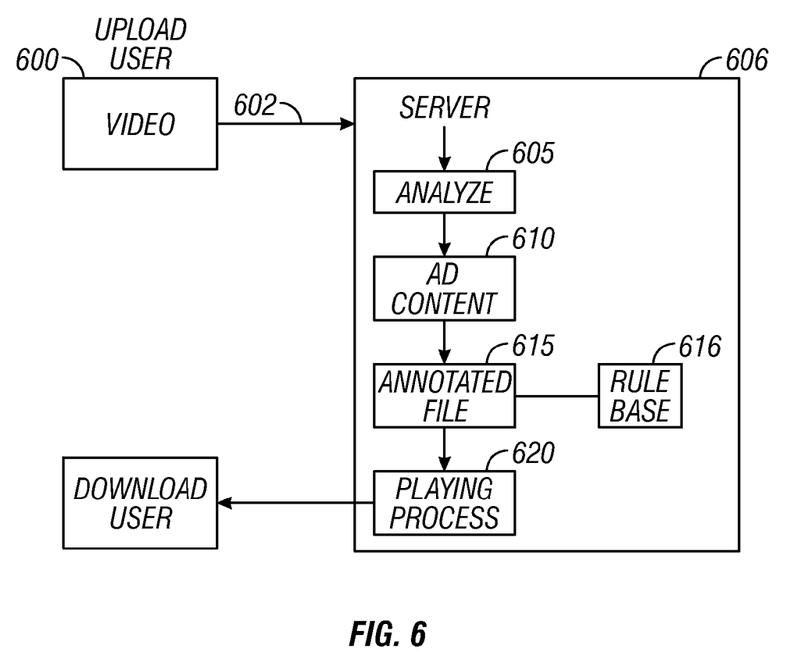
FIG. 6 shows an upload video embodiment.

FIG. 6 illustrates an alternative embodiment used in a video uploading site, such as "YouTube". Users upload videos to YouTube, and allow any person connected to the Internet to view those videos. Many do view the videos. All of this is free, and while YouTube proclaims to be advertiser supported, there are often difficulties in finding revenue from the free upload.

Another problem with YouTube is that the system allows uploads without a lot of supervision over the content. Users may upload pornographic content, or copyrighted or trademarked content, or violent content without proper permission.

The embodiment of FIG. 6 may use similar techniques to those disclosed above to analyze, categorize and annotate uploaded video.

In FIG. 6, a user 600 uploads a video 602 to a server. The server stores a number of different uploaded videos. In this embodiment, however, the server uses a number of different techniques for managing uploaded videos.

The system controls according to multiple different techniques. A first technique is a free upload, and free download in which the user can freely upload and download any videos. In this technique, the videos are processed as described above, and blank areas within the videos are found. The server adds advertisements into the blank or inanimate areas at random, to any video that has been uploaded as part of the free upload and download process. The advertisements may be in added as annotation instructions 272/273 as described above, so that a player of the videos can determine when and if to play the annotations.

A second membership may be free upload/ pay download. In this embodiment, anyone can upload the video, but the user pays for downloads. A user who pays for downloads may receive player instructions that avoid the embedded ads.

A third membership may be totally paid, where the user pays to upload. All users then can download and view the video without modification.

Figure 7:
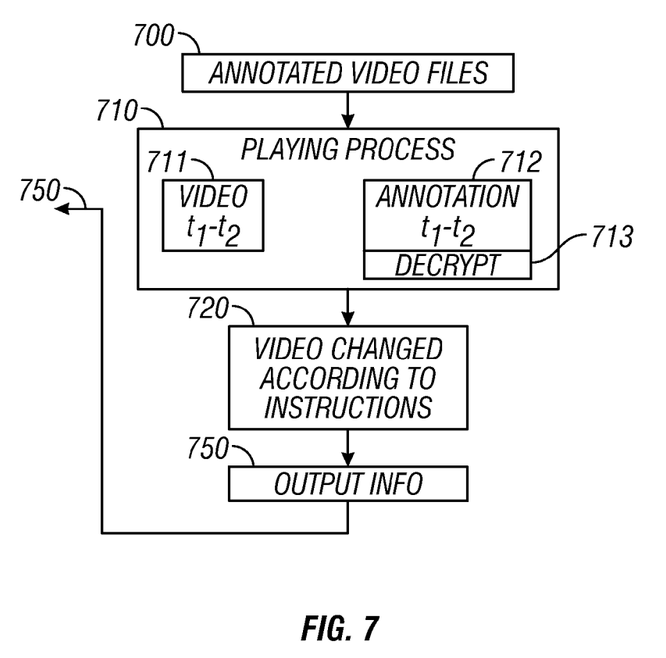
FIG. 7 shows a playing flowchart.

This technique may use the player described in FIG. 7, which plays the media according to the annotation instructions associated with the media.

The server carries out analyzing for open space at 605, and analyzing for ad content at 610. This may also analyze against databases for trademarks or copyrights or other proprietary information.

The analysis makes a list of items that should be considered during the annotation. The list may be processed according to a rule base 616.

The rule base indicates, for certain items, whether they should be covered/eradicated, or allowed or modified. Certain content, such as sexual content, will be prevented in its entirety. However, embedded ad content, may be processed according to whether certain companies/advertisers have made deals which allow payment for the embedded ad. If a user is drinking a coke during the video, coca cola may be charged according to an existing contract every time the video is played. The video creator may also receive some income from this, especially when the video has been played more than some number of times.

The analysis may also search for copyrighted materials for example movies or songs.

At 615, an annotated file is formed. The annotated file has annotation parts that instruct the player how to play the file.

The server also hosts a playing process at 620, which controls playing the annotated files. According to one embodiment, the playing process 620 may use this special kind of video player as described herein.

Figure 8:
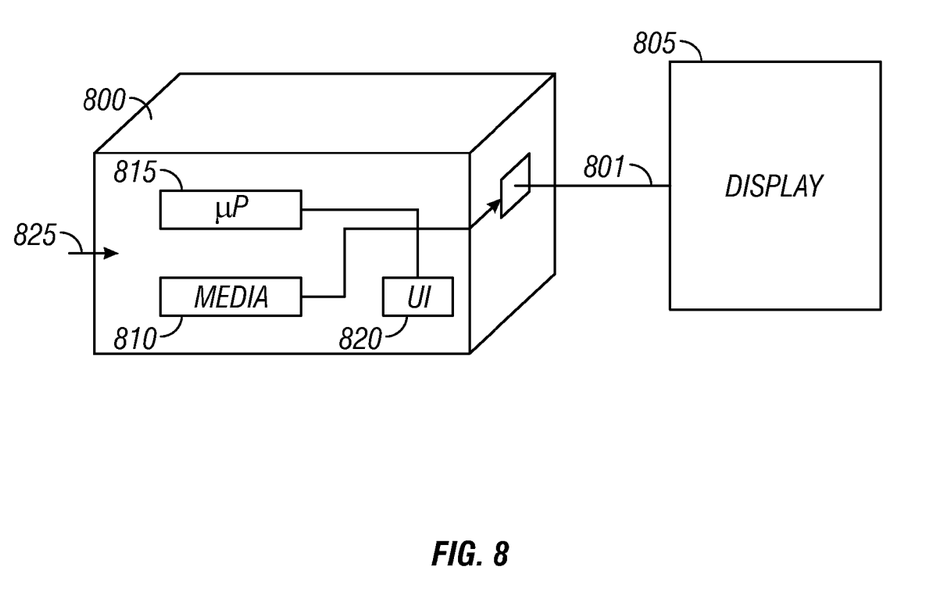
FIG. 8 illustrates a player.

FIGS. 7 and 8 illustrates a video player according to these embodiments that plays annotated video. This video player may be a software-based player such as used in the sixth embodiment of FIG. 6, or alternatively may be a hardware or firmware based video player, such as a DVD player or another media player that plays files from a removable source such as a data disk or solid state memory such as a flash drive. The player can be a television set.

The annotated video files 700 are played by playing process 710. The playing process reads the video information and the annotation information, changes at least some of the video according to the annotation information, and outputs video 750 based on both the video and annotation information. The video information, for example, may be sent to an embedded or external display, sent over the Internet, or displayed in any other way.

The playing process obtains two parts from the media: the video 711, and the annotation information 712. At any given time, it may only obtain a portion of this information. For example, it may operate according to streaming, to only obtain a section of video, such as an amount that is between two keyframes, or an amount of video to cover a specified amount of time such as from t1 to t2. as shown in the playing process 709. Change that to 711 for the video.

All or part of the annotation may be encrypted as described above. The annotations in the playing process 710 may include a decryption process 713 which can decrypt the annotated instructions.

The instructions provide information about how the video will be played, and may provide also conditional information. For example, the instructions may include, as above, areas where embedded advertisements can replace open areas. A two-part instruction system may include certain areas of advertisement that can be replaced, and may also include the specific advertisements that will be replaced.

Another set of instructions may include advertisements, and their last authorized playing date. For example, the instruction may be of the form there is an advertisement extending from times $t_x$ to $t_y$. The annotation indicates that the embedded advertisement, extending from these times, and in location z, can be played until Jan. 14, 2014. After that, the annotation indicates that either the advertisement should be blotted out, or replaced with a new embedded image or object that is in the developer section. The developer section may then include a object with revised advertisement, or may include a generic object that has no advertisement at all.

Another annotation may be simply a new name to put within the video, e.g. a change of the movie name, or change of place names.

At 720, the video is changed according to the instructions. The video information is output at 750.

FIG. 8 shows a player 800 which can be used to combine information from the video and the annotations, and play this information on the display 805. The entire unit may be one single unit such as a television or the like. This can include a removable media such as shown as 810, but could also receive this removable media over a network connection shown as 825.

The content on the media is processed by a processor 815 under control of a user interface 820. The processing may occur as shown in FIG. 7. The video output 801 may be shown on the display. The video output may be over wired, wireless or over a network connection.

In any of the embodiments herein, the annotations can be links to external sources of information, e.g., network (such as internet) links or links to an external data source.

The video file can also be a link to an external source, e.g., a source of video over IP.

Another embodiment, may sell and/or offer for sale time within the video. The information to be included in the video is included as annotations.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of media than those discussed above can be analyzed in this way. Audio media such as radio and songs might also be analyzed using speaker independent voice recognition to look for words to be taken out.

Also, the embodiment above has disclosed determining ad content and correlating among frames to find that ad content and making a list of that ad content and a player which can play the media to include or exclude or modify the ads.

According to another embodiment the "content" can be different content.

In one embodiment, the system can take exactly the same or analogous actions with adult or pornographic content, e.g., correlating among scenes looking for body parts or sex sounds in the scenes.

Another embodiment can the system can take exactly the same or analogous actions with violence, e.g., correlating among frames looking for blood or weapons.

These embodiments may be used to form dual rating versions of the media, e.g., PG versions and R versions, based on the information in the information base.

The annotation information can also be changed to later change the way the video is played. The annotation information can be as simple as a new name, for example, when a producing company or video owner changes, to change the name that is displayed. It can be used to change colors etc.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

The computers described herein may be any kind of computer, either general purpose, or some specific purpose computer such as a workstation. The computer may be a special purpose computer such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A system, comprising:
a computer readable medium stored on a non-transitory medium, having computer readable program information embodied thereon, said computer readable program information operating when executed by a processor to analyze a media file, stored on said non-transitory medium, where said media file is of a type and form which is playable to produce a media output that can be perceived by a user, said media file having media parts that represent the media output including at least multiple scenes in a video represented by the media file,
wherein said program information when executed by the processor operates to analyze said media file to find objects in scenes of the video among said multiple scenes in the video and to find parts of said scene that have no objects therein and represent open areas into which items can be inserted, where said open areas do not display any objects when the video is viewed,
and wherein said program information is also operative when executed by the processor to determine a time in the video of said open areas, and to store information indicative thereof;
and also said program information operating when executed by the processor to replace at least one of said open areas with advertising information,
wherein said program information also operates when executed by the processor to analyze said media file to find amounts of other movement in the scene,
and wherein said program information includes information indicative of a charge for putting said advertising information into one of said open areas, wherein said charge varies depending on said amounts of said other movement in the scene.

2. A system as in claim 1, wherein said program information also analyzes said media file to determine an amount of brightness in the scene when executed by the processor.

3. A system, comprising:
a computer readable medium stored on a non-transitory medium, having computer readable program information embodied thereon, said computer readable program information operating when executed by a processor to analyze a media file, stored on said non-transitory medium, where said media file is of a type and form which is playable to produce a media output that can be perceived by a user, said media file having media parts that represent the media output including at least multiple scenes in a video represented by the media file,
wherein said program information operates when executed by the processor to analyze said media file to find objects in scenes of the video among said multiple scenes in the video and to find parts of said scene that have no objects therein and represent open areas into which items can be inserted, where said open areas do not display any objects when the video is viewed,
and wherein said program information is also operative when executed by the processor to determine a time in the video of said open areas, and to store information indicative thereof;
and also said program information operating when executed by the processor to replace at least one of said open areas with advertising information,
wherein said program information also operating when executed by the processor to analyze said media file to determine an amount of brightness in the scene,
wherein said program information includes information indicative of a charge for putting said advertising information into one of said open areas, wherein said charge varies depending on said amount of brightness in the scene.

4. A system, comprising:
a computer readable medium stored on a non-transitory medium, having computer readable program information embodied thereon, said computer readable program information operating when executed by a processor to analyze a media file, stored on said non-transitory medium, where said media file is of a type and form which is playable to produce a media output that can be perceived by a user, said media file having media parts that represent the media output including at least multiple scenes in a video represented by the media file,
wherein said program information operates when executed by the processor to analyze said media file to find objects in scenes of the video among said multiple scenes in the video and to find parts of said scene that have no objects therein and represent open areas into which items can be inserted, where said open areas do not display any objects when the video is viewed,
and wherein said program information is also operative when executed by the processor to determine a time in the video of said open areas, and to store information indicative thereof;
and also said program information operating when executed by the processor to replace at least one of said open areas with advertising information,
wherein said program information also operates when executed by the processor to analyze said media file to find, for a specific advertising information, an amount of color change from a background and said specific advertising information.

5. The system as in claim 4, wherein said program information includes information indicative of a charge for putting said advertising information into one of said open areas, wherein said charge varies depending on amounts of color change from the background to the specific advertising information.

6. The system as in claim 4, wherein said program information includes information indicative of a charge for putting said advertising information into one of said open areas, wherein said charge varies for different open areas.

7. The system as in claim 4, wherein said computer readable program also encrypts said advertising information that is place within said open areas when executed by the processor.

8. The system as in claim 4, wherein said computer readable program information also accepts uploads of videos from other parties when executed by the processor, and automatically analyzes said videos that are uploaded to find said open areas therein, and to add at least one said advertising information into at least one of said open areas.

9. The system as in claim 8, wherein said computer readable program accepts a fee to allow uploading videos which will not have said advertising information added therein when executed by the processor.

10. The system as in claim 8, wherein said computer readable program also encrypts said advertising information that is placed within said open areas when executed by the processor.

11. A computer system, comprising:

a computer processor that operates to analyze a media file, wherein said computer processor also operates to play said media file, to produce a video output that can be perceived by a user, said video output including at least multiple scenes;

wherein said computer processor also operates to analyze said media file to find objects in said scenes and to find parts of said scenes that have no objects therein and represent open areas which do not contain any kind of object therein, and into which at least one advertising item can be inserted, and also to determine a time during which said areas do not have said objects therein, and to store information indicative of said analyzing the media file; also said computer processor replacing at least one of said open areas with said at least one advertising item), wherein said computer processor also operates to analyze said media file to find amounts of other movement in a scene, wherein said computer processor operates to store information indicative of a charge for putting said advertising item into one of said open areas, wherein said charge varies depending on said amounts of said other movement in the scene.

12. The system as in claim 11, wherein said computer processor also operates to analyze said media file to find amounts of other movement in a scene.

13. The system as in claim 11, wherein said computer processor also operates to determine an amount of brightness in a scene.

14. A computer system, comprising:

a computer processor that operates to analyze a media file, wherein said computer processor also operates to play said media file, to produce a video output that can be perceived by a user, said video output including at least multiple scenes;

wherein said computer processor also operates to analyze said media file to find objects in said scenes and to find parts of said scenes that have no objects therein and represent open areas which do not contain any kind of object therein, and into which at least one advertising item can be inserted, and also to determine a time during which said areas do not have said objects therein, and to store information indicative of said analyzing the media file; also said computer processor replacing at least one of said open areas with said at least one advertising item, wherein said computer processor also operates to determine an amount of brightness in a scene, wherein said computer processor operates to store information indicative of a charge for putting said advertising item into one of said open areas, wherein said charge varies depending on said amounts of brightness in the scene.

15. A computer system, comprising:

a computer processor that operates to analyze a media file, wherein said computer processor also operates to play said media file, to produce a video output that can be perceived by a user, said video output including at least multiple scenes;

wherein said computer processor also operates to analyze said media file to find objects in said scenes and to find parts of said scenes that have no objects therein and represent open areas which do not contain any kind of object therein, and into which at least one advertising item can be inserted, and also to determine a time during which said areas do not have said objects therein, and to store information indicative of said analyzing the media file; also said computer processor replacing at least one of said open areas with said at least one advertising item, wherein said computer processor also operates to analyze said media file to find, for a specific advertising item, an amount of color change from a background to said advertising item.

16. The system as in claim 15, wherein said computer processor operates to information indicative of a charge for putting said advertising item into one of said open areas, wherein said charge varies depending on said amount of color change from the background to said advertising item.

17. The system as in claim 15, wherein said computer processor also encrypts said at least one advertising item that is placed within said open areas.

18. The system as in claim 15, wherein said computer processor also accepts uploads of videos from other parties, and automatically analyzes said videos that are uploaded to find said open areas therein, and to add at least one advertising item into said open areas.

19. The system as in claim 18, wherein said computer processor accepts a fee to allow uploading of videos which will not have said at least one advertising item added therein.

* * * * *